(No Model.) 2 Sheets—Sheet 1.
R. KROEDEL.
PHOTOGRAPHIC SHUTTER.
No. 574,435. Patented Jan. 5, 1897.
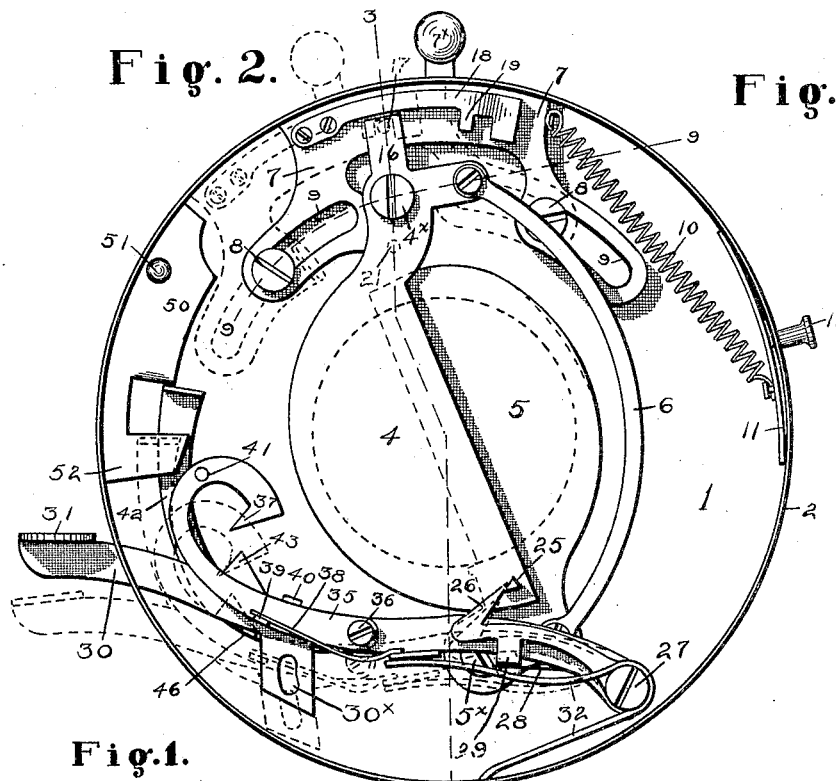
Fig. 2.
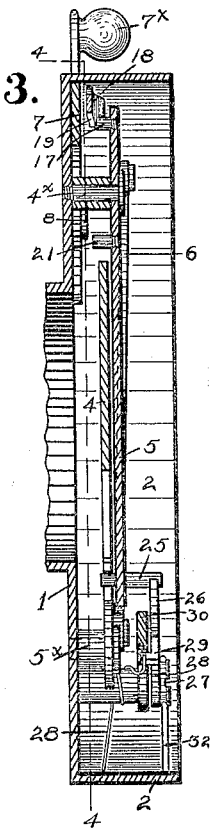
Fig. 3.
Fig. 1.
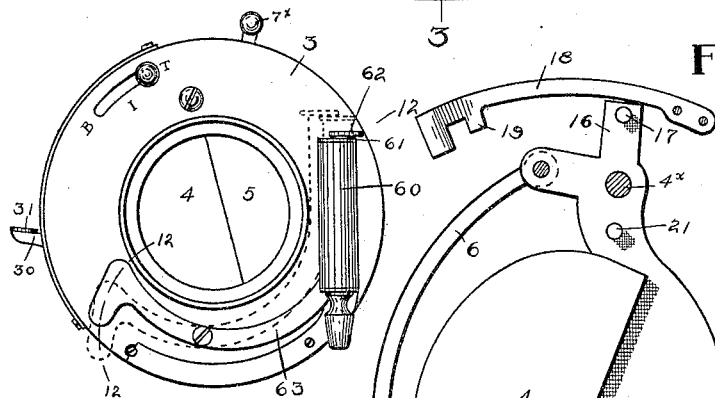
Fig. 4
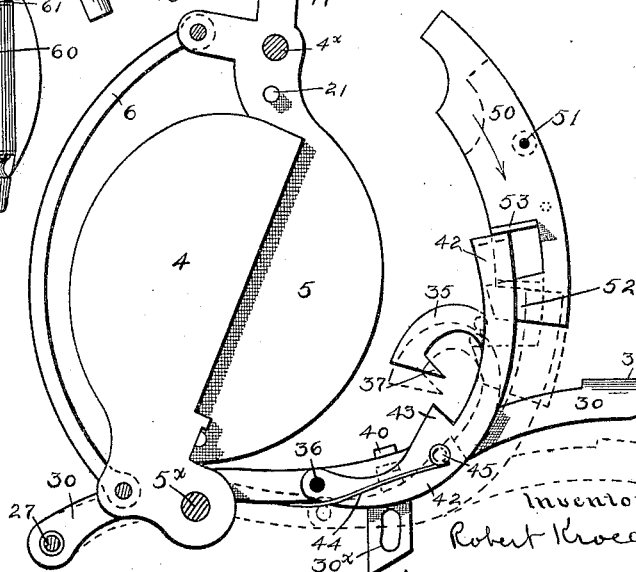
Witnesses:
G. Willard Rich.
J. H. Sutherland.
Inventor.
Robert Kroedel
by Frederick F. Church
his atty.
THE NORRIS PETERS CO., PHOTO-LITHO., WASHINGTON, D. C.

(No Model.) 2 Sheets—Sheet 2.
R. KROEDEL.
PHOTOGRAPHIC SHUTTER.
No. 574,435. Patented Jan. 5, 1897.
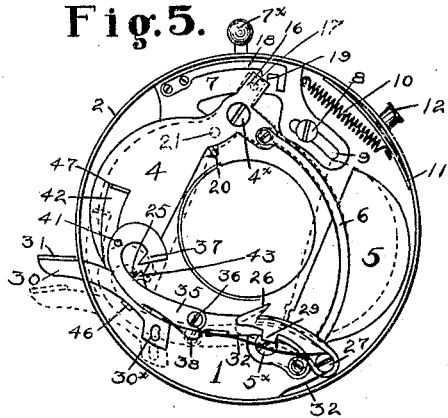
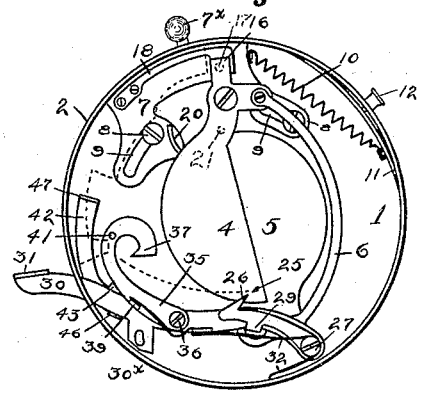
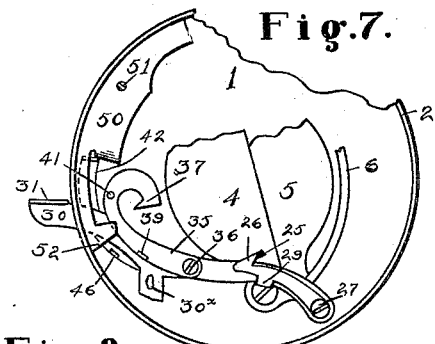
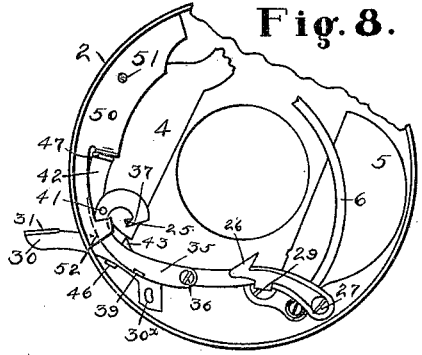
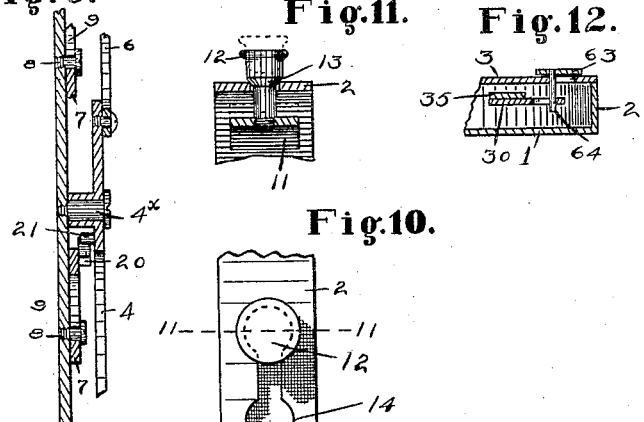
Witnesses:
Inventor,
Robert Kroedel

UNITED STATES PATENT OFFICE.

ROBERT KROEDEL, OF ROCHESTER, NEW YORK, ASSIGNOR TO THE EASTMAN KODAK COMPANY, OF SAME PLACE.

PHOTOGRAPHIC SHUTTER.

SPECIFICATION forming part of Letters Patent No. 574,435, dated January 5, 1897.

Application filed August 13, 1896. Serial No. 602,638. (No model.)

*To all whom it may concern:*

Be it known that I, ROBERT KROEDEL, of Rochester, in the county of Monroe and State of New York, have invented certain new and useful Improvements in Photographic Shutters; and I do hereby declare the following to be a full, clear, and exact description of the same, reference being made to the accompanying drawings, forming a part of this specification, and to the reference-numerals marked thereon.

My invention relates to shutters particularly adapted for use on photographic cameras, and has for its object to improve their construction and operation, whereby the shutter is opened and closed positively and the various adjustments necessary for operating the shutter for time, instantaneous, and "bulb" exposures are readily accomplished; and it consists in certain improvements hereinafter described, the novel features being pointed out in the claims at the end of this specification.

In the accompanying drawings, Figure 1 is a front view of the complete shutter; Fig. 2, a similar view with the front plate removed, showing the operating parts; Fig. 3, a sectional view on the line 3 3 of Fig. 2; Fig. 4, a sectional view on the line 4 4 of Fig. 3, looking toward the right and showing the parts in the position they occupy in Fig. 2 in full lines, looking from the rear; Fig. 5, a view similar to Fig. 2, showing the shutter open for a time exposure; Fig. 6, a similar view with the shutter set for instantaneous exposure; Fig. 7, a similar view with the parts set for a bulb exposure; Fig. 8, a similar view with the shutter held open during the bulb exposure; Fig. 9, a sectional view on the line 9 9 of Fig. 2; Fig. 10, an edge view of the case, showing the adjusting device for the tension-spring; Fig. 11, a sectional view on the line 11 11 of Fig. 10; Fig. 12, a sectional view on the line 12 12 of Fig. 1.

Similar reference-numerals in the several figures indicate similar parts.

The casing of the shutter may be of any suitable construction, but in the present invention it embodies a back plate 1, to which is attached an annular casing or rim 2, covered by a front plate 3 (shown in Fig. 1) and having a central aperture corresponding to the lens-aperture in the rear plate 1.

The shutter proper or light-intercepting medium in the present construction is composed of two wings or shutter members 4 and 5, the former pivoted on the screw $4^\times$ and the latter on the screw $5^\times$, said shutter members being connected by a curved bar or plate 6, secured on opposite sides of the pivotal centers and so arranged that they will be moved in opposite directions away from the lens-opening when an exposure is made and brought together over the opening, slightly lapping, as shown, to exclude the passage of light. While I prefer to use this type of shutter proper in connection with my improvements, as it enables the lens-aperture to be opened by a comparatively slight movement and enables small shutter-wings to be employed, I do not desire to be confined to a shutter of this type, as other forms can be used.

The means for causing the necessary movement of the light-excluding medium or shutter proper embodies a movable plate or member 7, in the present arrangement adapted to move in a curved path and held and guided on the rear plate 1 by means of screws 8, passing through curved slots 9, and it is moved in one direction by means of a spring 10, connected to an adjustable plate 11, detachably and adjustably secured to the rim 2. The plate 11 is preferably formed of spring metal and is provided with an arm 12, having an enlargement or shoulder 13, adapted to coöperate with the recesses 14 in the slot 15, formed in the rim 2, or a suitable plate not forming part of the casing, the construction being such that while the tension of the spring 11, bearing on the inside of the rim, will hold the enlargement 13 in engagement with the recesses 14 and thereby prevent the longitudinal movement of the plate said plate may be adjusted and the tension of the spring varied by pulling outward upon the knob 12, disengaging the shoulder 13 and moving the plate around against the spring and then reëngaging the shoulder with another recess, as shown in Fig. 10. One of the shutter-wings, in the present instance the wing 4, is provided with an extension-arm 16, having a pin 17 projecting from its under side and arranged to coöp- erate with the spring-latch 18 on the actuating member or plate 7, said spring normally pressing toward said projection, and when the plate 7 is moved to the left by means of its operating-knob 7×, as shown in full lines in Fig. 6, the projection 19 on said spring will pass behind the pin 17, and when the plate 7 is permitted to move to the right the spring 10 will turn the shutter in position to open the lens-opening. The member 7 is further provided with the shoulder or rib 20, arranged to coöperate with a pin 21, formed on the shutter member 4 on the opposite side of its pivot from the projection 17, and the spring 18 and shoulder 20 are so relatively arranged that after the movement of the member 7 to the right to throw the shutter open the operating projection 19 on the spring 18 passes beyond the path of the pin 17 and the projection 20 engages the pin 21 on the opposite side of the center of rotation and forces the shutter closed again, the operation just described being shown particularly in Figs. 2, 5, and 6. From this it will be seen that to set the shutter it is only necessary to move the member 7 from the position shown in Fig. 2, full lines, to the left, as in dotted lines, thus placing the spring under tension and engaging the spring-latch 18 with the pin 17. Then by releasing the parts (either the shutter or the movable member 7) the first half movement of the member will throw the shutter open and disengage it from the actuating portion of the member, and the shutter may be held open by any desired means. The continued movement of the member 7, however, will cause the shutter to be closed by the engagement of the shutter 20 and projection 21.

In the present embodiment of my invention I prefer to control the operation of the movable member 7 and the shutter by suitable engaging devices coöperating directly with a shutter member itself, although this construction is not essential to the operation of my device, and I therefore arrange upon the free end of the shutter member 4 a pin 25, preferably angular, as shown, with which coöperates a catch 26, pivoted upon a screw or stud 27 and operated in a direction to throw its engaging end into the path of the pin 25 by means of a small spring 28. (Shown particularly in Fig. 3.) This catch 26 is also provided with a lug or extension 29, passing beneath a release member in the form of a lever or plate 30, pivoted upon the stud 27 and having its end projecting out through the casing and provided with an operative thumb-piece 31, the construction being such that downward pressure upon the end of lever 30 will cause the release of the catch from the shutter member, but when the lever resumes its normal position by reason of the spring 32 the catch 26 is free to yield and engage the projection on the shutter as the shutter member returns to its position over the lens-opening. The member 30, while preferably a lever, is not necessarily pivoted.

Unless means are provided for arresting the shutter when thrown open the parts just described will be suitable only for instantaneous exposures, as the motor device described, when properly set, would operate when the shutter was released by the movement of the catch to open the lens-aperture and then close it; but in order that the shutter may be adapted for time exposures and also for making what are termed "bulb" exposures, (that is to say, those in which the shutter is opened by pressure on the releasing-lever or corresponding part, is held open while this pressure is continued, and closed when it is released,) I provide two relatively movable projections or catches operated by the operating lever or member and capable of manipulation to cause the desired operation.

35 indicates a catch in the form of a curved arm pivoted at 36 upon the lever 30, having a pointed end 37, the side to the left forming a retaining-shoulder for the pin 25 on the shutter, said catch-arm 35 being actuated in one direction by a spring 38, secured to the lever 30 at one end and operating upon a lug or projection 39 at the other, said catch-arm 35 being further provided with a stop projection 40, coöperating with the upper edge of the lever 30. Also mounted upon the pivot 36, and preferably arranged upon the rear side of the lever 30, is a catch in the form of an arm 42, having a shoulder 43, adapted to be projected in the path of the pin 25 on the shutter by means of a spring 44, secured to the lever 30 at one end and operating upon the projection 45 on the catch 42 at the other. An ear 46 on the catch-arm 42, engaging the under side of the lever 30, limits the movement of said catch-arm 42, and the extreme end is provided with a lug or ear 47, Fig. 8, with which the device for controlling said catch coöperates. The catch 35 is also provided with a pin 41, by means of which its position is controlled.

The device for varying the position and operation of the catches 35 and 42 in the present instance consists of a plate 50, sliding on the under side of the face-plate 3 of the shutter mechanism and manipulated by an arm or handle 51, projecting through a slot in said face-plate 3 and serving as an index to coöperate with the indications, in the present instance letters "B," "I," and "T," Fig. 1, indicating bulb, instantaneous, and time exposures, and this plate 50 is provided with a projection 52 at its lower end arranged to coöperate with the pin 41 and with a downwardly-turned shoulder or ear 53 for coöperating with the end 47 of the catch-arm 42.

The plate 50 may be retained in its position of adjustment by making it of spring metal and causing sufficient friction between it and the plate 3 to hold it in any position of adjustment, or other devices may be applied for the purpose.

The operation of this portion of my invention will now be readily understood.

When the plate 50 is in the position shown in Fig. 3 and its projections or shoulders are out of the paths described by the coöperating projections on the catches 35 and 42, the shutter is adapted for time exposures, so that when the motor mechanism is under tension the operator, by moving the lever 30 downward, causes the catch 26 to release the shutter, which flies open, the pin 25 passing beneath the end 37 of the catch 35, and the tension of the motor then operating to close the shutter member brings said pin 25 into engagement with the rear of the projection 37, which retains the shutter until pressure on the thumb-piece 31 is released, when the spring 32 will raise the lever 30, releasing the projection 25 from the end 37 and causing it to become engaged by the projecting end 43 of the catch 42, thus retaining the shutter open, as shown in Fig. 5. When the desired time has elapsed, a second pressure on the lever 30 will move the projection 43 out of the path of the pin 25 and allow the motor to close the shutter.

When it is desired to make an instantaneous exposure, the plate 50 is moved downward to the position shown in dotted lines in Fig. 6, the shoulder 52 being then in the path described by the pin 41 on the catch 35, so that when the lever 30 is pressed down the catch 26 will release the shutter, and the pin 25 on the shutter, moving through the arc indicated by the dotted line in Fig. 6, will not be arrested by the projection 37, but can move outward and inward freely, opening and shutting the lens-opening, as will be understood, the rapidity of the exposure depending on the tension of the motor-spring.

When it is desired to make a bulb exposure, the plate 50 is moved down to its lowermost position, with the button 51 in proximity to the letter "B," (see Fig. 1,) the lug or ear 53 on said plate pressing the arm 42 downward, so that the shoulder 43 will be out of the path of the projection 25 on the shutter, as shown particularly in Fig. 7. When now the lever-arm 30 is moved downward, the shutter is released and flies open, the projection 25, engaging the beveled end 37 of the catch 35, passes under and becomes engaged with said end, as shown in Fig. 8, and the engaging end 43 of the catch 42, being held out of the path of the projection 25 on the shutter-wing, the shutter will be held open as long as pressure is maintained on the operating end 31 of the lever, and when released the shutter will be closed by its motor-spring. While this is termed a "bulb" exposure, it is not absolutely necessary that it be made by the use of a pneumatic bulb or engine, but I prefer mounting upon the face-plate 3 a cylinder 60, having a piston 61 operating therein and adapted to engage the end 62 of the lever 63, pivoted on said face-plate and having a pin 64 passing through a slot and entering the slot 30× in the extension formed upon the lower side of the lever 30, this loose connection permitting the operation of the releasing-lever either by means of the bulb or by manipulation of the end 31.

The shutter just described is quite simple, considering its capabilities, and the parts thereof are preferably made of sheet metal, so as to be readily stamped and formed in dies.

The feature of arresting the shutter member for time or bulb exposures just as it commences its closing movement is very desirable, because if it were arrested near the end of its opening movement the momentum would cause a jar to the camera and lens and prevent obtaining a sharply-defined image, but as the catch 35 engages the pin 25 before the shutter has any momentum to speak of there will be no objectionable jarring.

The form of the motor device employed operating the shutter member in opposite directions by a continuous movement in one direction relieves the camera from jar.

This shutter can be used between the lenses or behind or in front of them, as desired.

As before stated, while I prefer to employ a two-part shutter it will be understood that this particular form of shutter is not essential to the operation of some of the parts of my invention, as other forms could be used without materially changing the operation; nor do I wish to be limited to the particular form of the progressively-movable member actuating the shutter in both directions. The particular form also of the various catch projections connected to and operated by the single part 30, which I have termed a "lever" herein, could be greatly modified without departing from the spirit of my invention.

I claim as my invention—

1. In a photographic shutter, the combination with the shutter member pivoted at 4× and having the projections, as 17 and 21, on opposite sides of the pivot, of the motor member 7 having projections thereon for engaging the projections 17 and 21 on the shutter member, and means for operating the motor member progressively in one direction, substantially as described.

2. In a photographic shutter, the combination with a pivoted shutter member, of a progressively-movable motor member, a latch arranged between the motor member and the shutter member on one side of the pivot of the latter, and positively engaging projections between the motor member and the shutter member on the other side of its pivot, and retaining devices for controlling the progressive movement of the motor member, substantially as described.

3. In a photographic shutter, the combination with the pivoted shutter member, having the projections on opposite sides of its pivot, of the progressively-movable motor member, having the spring-latch thereon engaging one projection and the shoulder engaging the other projection on the shutter member, substantially as described.

4. In a photographic shutter, the combination with the slotted and recessed casing, and a shutter member operating therein, of a motor-spring for operating the shutter, the adjustable spring-plate to which it is connected, and the pin thereon passing through the slot in the casing having the head held in engagement with one of the recesses by the spring-plate, substantially as described.

5. In a photographic shutter, the combination with the casing, the progressively-movable motor member, guided and movable upon the casing, and the spring-latch and the projection on said member, of the pivoted shutter member having the projections on opposite sides of its pivot, with which the latch and projection coöperate, and the adjustable spring for operating the motor member in one direction, substantially as described.

6. In a photographic shutter, the combination with a movable shutter member, and devices for actuating said member in opposite directions at each exposure, of a movable release member and a catch carried thereby for retaining the shutter closed and yielding in a direction to permit the closing of the shutter independently of the release member, substantially as described.

7. In a photographic shutter, the combination with a movable shutter and spring-motor devices for throwing it open and closed, of a release member, a spring-operated catch for engaging the shutter and holding it closed and operated in a direction to release the shutter by the movement of the release member, substantially as described.

8. In a photographic shutter, the combination with a shutter member and spring-motor devices for throwing it open and closed, of a pivoted release-lever, a pivoted spring-operated catch for engaging the shutter member and holding it closed, and connections between said catch and the lever, whereby it will be actuated by the movement of the release-lever in one direction but is permitted to yield independently thereof to permit the closing of the shutter, substantially as described.

9. In a photographic shutter, the combination with a vibrating shutter member and motor devices for throwing it open and closed, of a movable release member, a catch for retaining the shutter closed, movable independently of the release member but actuated by the latter to release the shutter, and controlling devices carried by the release member for regulating the closing of the shutter member, substantially as described.

10. In a photographic shutter, the combination with a vibratory shutter member, and motor devices for actuating it in both directions, of a movable release member, a catch for retaining the shutter closed movable independently of the release member but actuated by said member to release the shutter, controlling devices for regulating the closing of the shutter actuated by the movable release member, and adjusting devices acting upon the controlling devices to set them and vary their operation upon the shutter, substantially as described.

11. In a photographic shutter, the combination with a shutter member and motor devices for opening and closing it, of a catch for holding the shutter closed, a movable release member actuating the catch to release the shutter, and two catches operated by the movement of the release member and controlling the movement of the shutter member, substantially as described.

12. In a photographic shutter, the combination with a shutter member and motor devices for opening and closing it, of a catch for holding the shutter closed, and two catches for holding the shutter open and engaging it in succession when the motor devices tend to close it, and means for moving said last-mentioned catches successively out of engagement with the shutter, substantially as described.

13. In a photographic shutter, the combination with a shutter member and motor devices for opening and closing it, of a catch for holding the shutter closed, and two catches for holding the shutter open and engaging in succession when the motor devices tend to close it, a release member controlling said three catches and operating to move said two catches successively out of engagement with the shutter, substantially as described.

14. In a photographic shutter, the combination with a shutter member and motor devices for opening and closing it, of a catch for holding the shutter closed and a pair of catches for holding the shutter open and engaging in succession, a spring for actuating the catch first engaging when the shutter tends to close, and connections between the pair of catches for releasing them in succession, substantially as described.

15. In a photographic shutter, the combination with a shutter member and motor devices for opening and closing it, of a catch for holding the shutter closed and a pair of catches for holding the shutter open and engaging in succession, a spring for actuating the catch of the pair first engaging when the shutter tends to close, an adjusting device for holding said catch out of operation, and connections for actuating the catches to release in succession, substantially as described.

16. In a photographic shutter, the combination with a shutter member and motor devices for opening and closing it, of a catch for holding the shutter closed, a pair of catches for holding the shutter open and engaging in succession, and adjusting devices for holding one or both of the catches of the pair out of engaging position, substantially as described.

17. In a photographic shutter, the combination with a shutter member and motor devices for actuating it, of a catch for holding the shutter closed, a pair of catches for holding the shutter open and engaging in succession, one of the catches of said pair being spring-actuated, a movable release member controlling said three catches, and adjusting devices for holding one of the catches of the pair out of engaging position, substantially as described.

18. In a photographic shutter, the combination with a vibratory shutter member and motor devices for actuating it in opposite directions, a catch for retaining the shutter closed and a pair of catches for controlling its closing movement, one of the catches of the pair being adjustable out of engaging position, substantially as described.

19. In a photographic shutter, the combination with a vibratory shutter member and motor devices for actuating it in opposite directions, of a catch for retaining the shutter closed, a movable release member, a spring for actuating it, a pair of catches mounted on the release member, a spring for actuating the catch of the pair first engaging the shutter when the motor tends to close it, adjusting devices for holding the said spring-actuated catch out of operative position and connections between the release member and the catch that holds the shutter closed, substantially as described.

20. In a photographic shutter, the combination with a vibratory shutter and motor devices for actuating it in opposite directions, of the pivoted release-lever, a spring for operating it, a catch for holding the shutter closed and actuated by the release-lever, the two spring-actuated catches on the lever for controlling the shutter, and relatively stationary adjusting devices for controlling the position of the two catches on the lever, substantially as described.

21. In a photographic shutter, the combination with the vibratory shutter member and a projection thereon and motor devices for actuating the member in opposite directions, of the spring-actuated movable release member, the catch for engaging the projection on the shutter and actuated by the member, the pair of spring-actuated catches on the movable member projecting in opposite directions and arranged to engage the shutter projection in succession, and relatively stationary adjusting devices for holding one or both of the catches of the pair out of the path of the shutter projection, substantially as described.

22. In a photographic shutter, the combination with the vibratory shutter member having the projection 25, and a motor device for actuating it in opposite directions, of the lever 30, the catch 26 actuated thereby, the catches 35 and 42 pivoted on the lever and their actuating-springs, and the movable plate 50 having projections engaging the catches 35 and 42, substantially as described.

23. In a photographic shutter, the combination with the casing having the aperture, the two shutter members pivoted on opposite sides of the aperture and connected for simultaneous operation in opposite directions, and the pins 17 and 21 on one member, of the plate 7, the spring for actuating it, the spring-latch 18 and projection 20, and controlling devices for regulating the movement of the plate 7, substantially as described.

24. In a photographic shutter, the combination with the casing, a movable light-excluding medium or shutter, proper, motor devices and controlling devices within the casing, of the lever 30 having the operating portion 31, the lever 63 pivoted to the casing, the pneumatic cylinder on the casing and its piston engaging the lever 63 and the slot-and-pin connection between the levers 30 and 63, substantially as described.

25. In a photographic shutter, the combination with a vibratory shutter member and motor devices for actuating it in both directions, of a movable release member, a catch for retaining the shutter closed, movable independently of the release member but actuated by said member to release the shutter, a pivoted spring-operated catch on the release member operating to hold the shutter open and moved into engaging position when the holding-catch is released by the movable member, substantially as described.

26. In a photographic shutter, the combination with the shutter member, and a spring-motor device engaging the shutter member on opposite sides of the pivot to move it in opposite directions at each exposure, of the pin at the free end of the shutter member, the catch engaging the pin to hold the shutter member closed, and the spring-operated catch engaging said pin to hold the shutter open after it has completed its opening movement and at the beginning of its closing movement, substantially as described.

27. In a photographic shutter, the combination of a pivoted shutter member, a motor device for actuating it in opposite directions at each exposure, a catch for holding the shutter closed, and a spring-operated catch, automatically engaging the shutter after it has completed its opening movement and at the beginning of its closing movement, substantially as described.

28. In a photographic shutter, the combination of the pivoted shutter member, a motor device for actuating it in opposite directions at each exposure, a catch for holding the shutter closed, a movable release member arranged to release the said catch, and a spring-catch for holding the shutter open, pivoted on the release member and moved by the release member into position to engage the shutter when the first-mentioned catch is released, substantially as described.

ROBERT KROEDEL.

Witnesses:
F. F. CHURCH,
M. W. TUTTLE.